March 3, 1970  R. A. CLARK, JR  3,499,117
REMOTE OPERATOR COIN CONTROL USING MULTI-FREQUENCY TONES
Filed May 19, 1967  8 Sheets-Sheet 1

Inventor:
Robert A. Clark, Jr.,
by
Att'y.

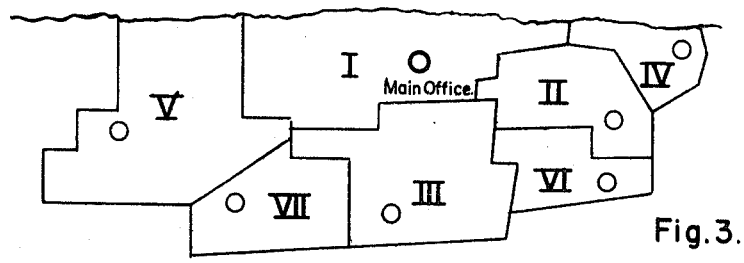
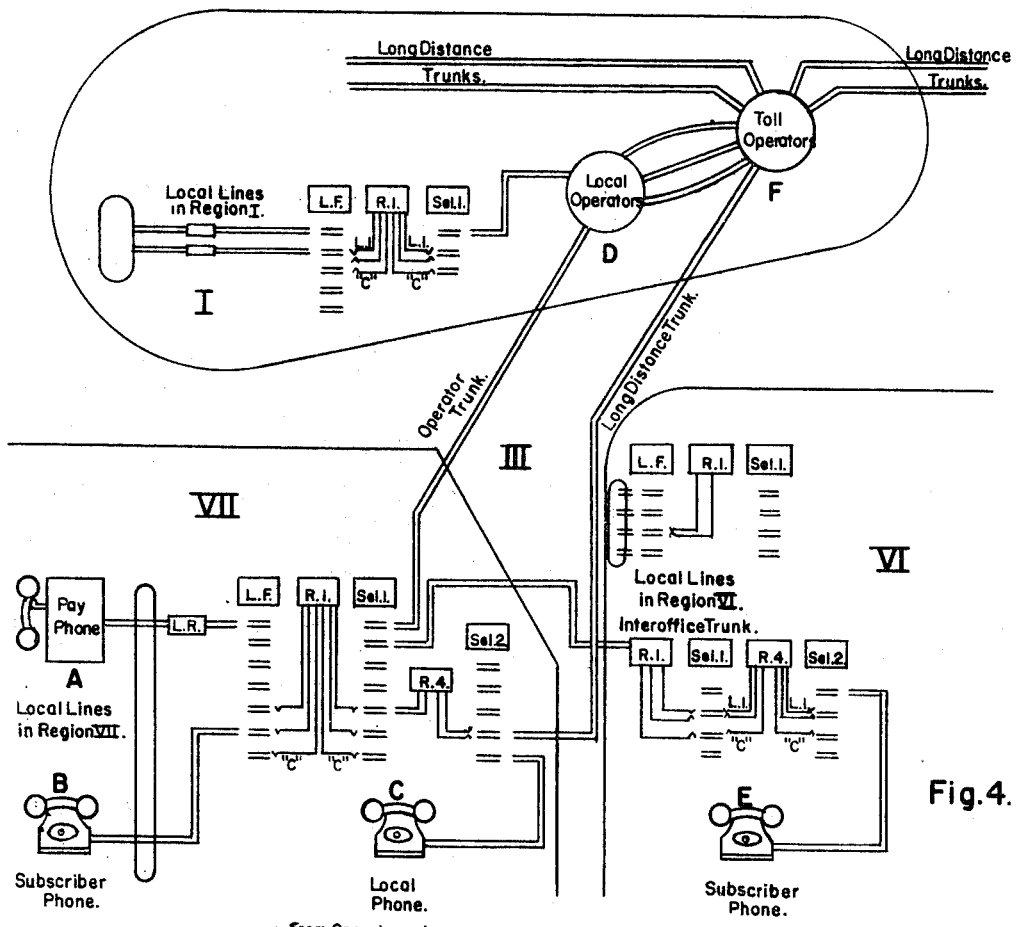
Fig.3.
Fig.4.
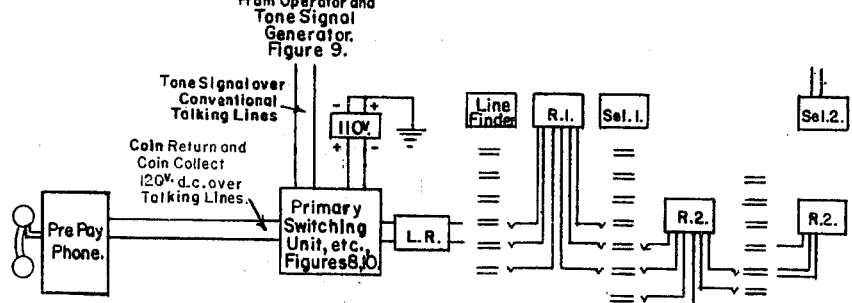
Fig.5.
Inventor,
Robert A. Clark, Jr., by Inventor:
Robert A. Clark, Jr., Inventor:
Robert A. Clark, Jr.,
by [signature]
Atty.

Inventor:
Robert A. Clark, Jr.
by
Atty.

March 3, 1970 R. A. CLARK, JR 3,499,117
REMOTE OPERATOR COIN CONTROL USING MULTI-FREQUENCY TONES
Filed May 19, 1967 8 Sheets-Sheet 6

Inventor:
Robert A.Clark, Jr.,
by
Atty.

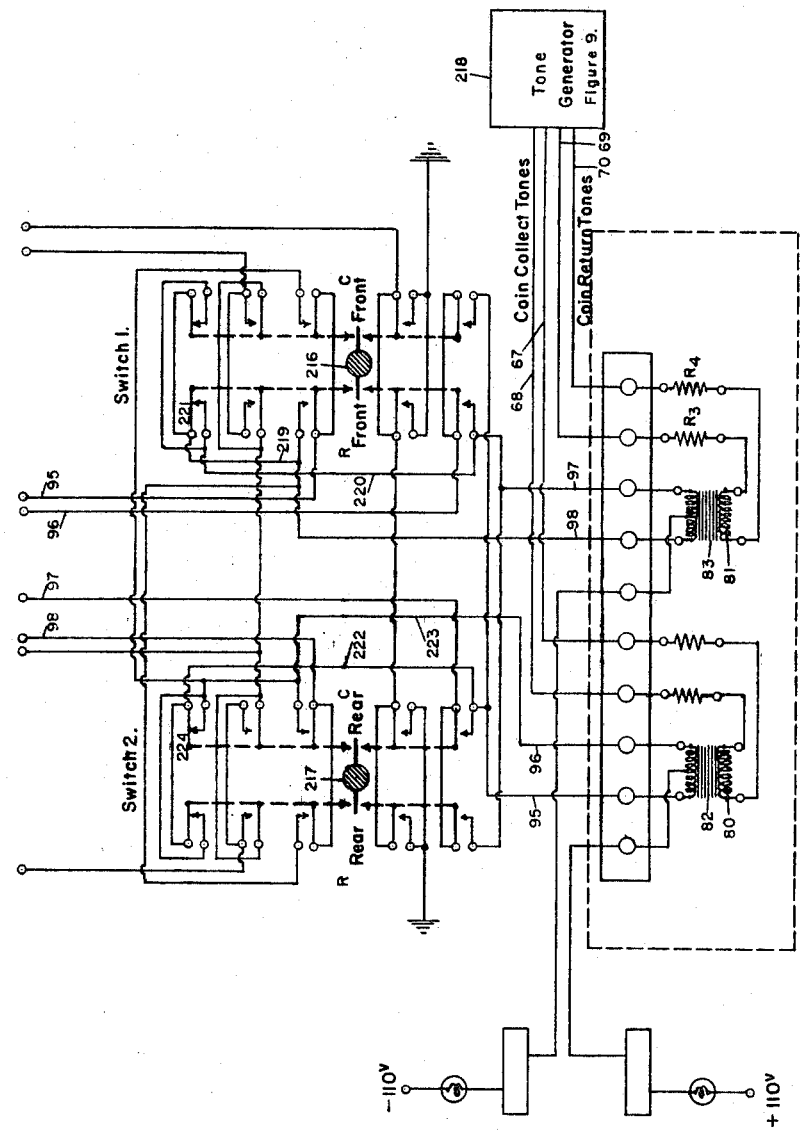

3,499,117
REMOTE OPERATOR COIN CONTROL USING MULTI-FREQUENCY TONES
Robert A. Clark, Jr., Fort Lauderdale, Fla. (% Communication Equipment & Engineering Co., 5646 W. Race Ave., Chicago, Ill. 60644)
Filed May 19, 1967, Ser. No. 639,790
Int. Cl. H04m *17/02*
U.S. Cl. 179—6.3                  17 Claims

ABSTRACT OF THE DISCLOSURE

A telephone system serving a central area by attended office; and serving satellite areas by unattended offices: Pre-pay telephones connected to each unattended office; generation of code frequency coin return and coin collect signals at the attended office; delivery of such signals under attended office operator control over telephone lines, to the unattended offices; delivery of coin return and collect D.C. signals from the unattended offices to the pre-pay telephone coin return or coin collect units over short metallic lines of maximum conductivity, under frequency signal control at the unattended offices; with provision at the unattended offices to automatically handle various colateral and related operations.

---

Figure 2:
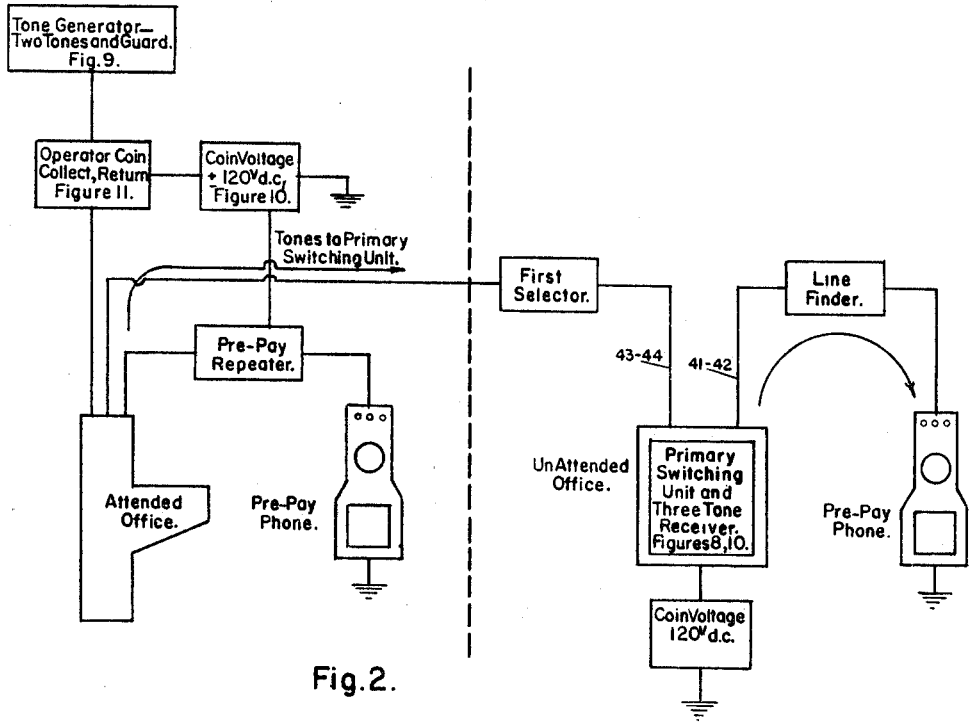

This invention relates to improvements in pre-pay telephone systems, and the like. A primary object of the present invention resides in the provision of structures whereby there are made available to comparatively small telephone systems serving comparatively small numbers of subscribers, scattered over relatively large areas, all of the advantages heretofore incident to presently "conventional" full pre-pay system operations, such as are used in large cities or other relatively compacted residential areas, when such previous installations have been of either Independent or Bell type. The present improvements also find economic application to conversions of such present Independent or Bell type installations, heretofore using post-pay" operations, to "pre-pay" operations, with the advantages incident to use of such pre-pay operations, and which are well known to the industry, and will be referred to more fully hereinafter. Such advantages are both economic, including lowered installational and operational costs, and advantages due to ability to better serve the subscribers to such smaller systems, then when using post-pay operations, heretofore widely used. Included in such advantages are large savings in line costs needed for operation of the "collect" and "return" coin facilities, of pay stations, as compared with line costs heretofore needed for serving pre-pay installations in such sparsely settled areas, as already referred to. Such savings in line costs and related equipment, are due to the fact that, when using the presently to be disclosed improvements, it is not necessary to provide attended offices in direct association or connection with the several pay stations, especially when such pay-stations are located distant from attended offices, thus making it unnecessary to run full metallic lines from attended offices to the pay stations in question; but at the same time making provision for full metallic lines into the return and collect facilities of the pay stations, for operation of such facilities. This result is produced by the provision of "un-attended" offices at locations convenient to servicing the needs of sparcely settled areas, close to the pay stations being served by such un-attended offices, but under conditions such that such un-attended offices are connected to an attended office centrally located with respect to a number of the un-attended offices, and serving the needs of all such un-attended offices. With this type of overall layout, provision has been made, as hereinafter to be disclosed, for transmitting signals between such an attended office and its satellite un-attended offices, over presently available, but not necessarily full metallic lines, to the several un-attended offices, needed to cause signals to be transmitted from the un-attended offices over comparatively short metallic lines to the several pay-stations, for producing the operations of "return" or "collect" of the pre-paid coins, and such other operations as may be required, depending on the type of call, whether or not the call has been completed, whether over-time must be required for continuation of a call beyond the specified base time interval, and various other specific operational conditions, which will be hereinafter referred to. Thus, the presently to be disclosed improvements eliminate the special metallic trunk and line-finder/selector groups which are inherently inefficient, costly, and otherwise economically degrading, characteristic, of conventional pre-pay systems.

At the outset it is noted that whatever system is used for the full pre-pay operations, provision must be made for producing the various operations incident to various kinds of calls, and to meet such primary operational conditions as are imposed by the need for dropping the proper value of coins demanded by a long distance operator, with provision for audible check of the value and number of coins dropped, when a long distance call is being made; provision for retaining the coins in escrow until a local call is completed, with provision for "collecting" the coins when such call is completed and when the parties have hung up after termination of the call; provision for "returning" the coins from escrow when the called party fails to answer; and in case of calls wherein a base charge is made for a base time of the call, after completion by the answer of the called party. Overtime charges impose requirements for dropping overtime coins. Other operational conditions may also be present requiring provision of structures constituted to meet them.

When full metallic lines are necessary between the attended office and the subscriber's pre-pay phone, in order to take care of the various signals needed for operations, such as defined above, it is evident that installation and upkeep charges incident to such full metallic lines may be so large as to make the local subscriber station uneconomic, especially when the number of subscribers using such line is small, or the population of the area being served, is sparce.

The prime object of the present invention is to provide improvements such as to avoid the need of provision of a dedicated metallic line for transmission of the needed signals between an attended office and a local pre-pay, coin box installation. This objective is attained by provision of a "Primary Switching Unit" within or close to the pre-pay subscriber receiver in question, or close to or within a local area including several or many of the subscriber pre-pay units. Such Primary Switching Unit (herein sometimes designated as P.S.U.) includes units responsive either directly or indirectly to control signals received from the attended office, and constituted to respond to such received signals; with emission of control signals delivered to the pre-pay subscriber's station, including its coin collect and coin return elements. The elements of such P.S.U. include a control switching unit constituted to receive and respond to signals emitted by the sending (attended) station, and to deliver signals to the coin collect and coin return elements of the pre-pay station, as proper. Various operations needed to control the pre-pay station, and to respond to signals received from the attended office, are also included in such P.S.U., and related relays and other elements, presently to be described in detail.

Such P.S.U. thus comprises an important element of what will be hereinafter termed an "Unattended" office, since, it performs various operations, some instituted by signals received from the "Attended" office, and others under control of the pre-pay receiver, thus making unnecessary the presence of an attendant at such local Unattended office.

I have made provision for delivering various control signals between the Attended office and the Unattended office, to institute and control the operations of the P.S.U. and other units of such Unattended office. I have explained the elimination of need for a full metallic line between the Attended office and each of the pre-pay subscriber stations. I make provision for delivery of tuned frequency signals which preferably lie within the audible range, over metallic (but not necessarily full metallic) lines conveniently available, with provision of responsive resonant elements in the Unattended station or office, tuned to receive and respond to such sonic signals so sent from the Attended office. The provision for emission and response to such sonic control signals, will be fully disclosed hereinafter. Such responses, including the operation of the P.S.U. of the Unattended office, include delivery of D.C. of proper voltage and polarity, to the coin collect and/or return units of the pre-pay subscriber receiver station. Since the P.S.U. of the Unattended office is equipped to receive and respond to the sonic signals sent from the Attended office, such signals not requiring transmission of appreciable power values, they can be transmitted over conventional metallic lines available between the Attended office and the Unattended office; and the P.S.U. in such Unattended office may and does then operate relays comprising a portion of such Unattended office by which the D.C. of proper voltage and polarity is sent, over metallic lines (of comparatively short length), to the subscriber pre-pay station. Accordingly, the voltage drop of the coin return and/or collect signals, needed for proper operation of such coin collect and/or return units, may be retained within acceptable values, without need of providing excessively large metallic lines, between the Unattended office, and the subscriber station. Since the sonic frequency signals between the Attended office and the Unattended office, may be of the order of milliamperes current value, and since the delivered voltage of such signals need not be large (the translation of such signals being based on frequencies, not current or voltage values), such signals may be transmitted over such metallic lines as are conventionally available between the Attended office and its satellite, Unattended offices, even when the distances between such two offices are considerable, and of such magnitude as would otherwise require the presence or installation of full metallic lines to deliver D.C. signals of current values, sufficient to ensure dependable operation of the coin collect and/or return structures of the pre-pay receiver in question. It has been shown that 110 v. D.C. or 120 v. D.C. may suffice for dependable operation of the coin box elements for such distances as will usually exist between an Unattended office and any of the pre-pay stations under its control. The following further explanation is proper:

There may be one or several of the Unattended offices connected to an Attended office by conventional metallic lines, each such Unattended office servicing one or several of the pre-pay receiver stations. Such operational facilities are made possible by introduction of suitable line-finders and selectors into the lines between the Unattended office and the several pre-pay receivers, and into the lines between the Attended office and the several Unattended offices under its control, respectively. Also, numerous conventional calling stations may be connected to and their calls handled by, each Unattended office in conventional manner, the calls between such conventional stations and the Attended office being transmitted through the Unattended office. Under this basic system of structures the metallic line (or lines) between the Attended office and the Unattended office in question, may be used at a high use rate; the uses whereof include both the pay calls from the pre-pay stations served by the Unattended office, and local calls between numerous conventional stations connected to such Unattended office.

The following features are included in connection with the sonic signals and their uses, and the structures which have been provided in connection therewith:

The control frequencies include one frequency for activating the collect operations of the coin box, and another frequency for activation of the return operation of such coin box. These frequencies are applied to suitable structures for delivery of the signals to the coin box being served. Such frequencies are preferably selected within the audible range. As examples, the frequency for the collect operation activations may be 2200/c.p.s., and for the return operation activations may be 2700/c.p.s. For purposes of security against improper functioning of either the collect or the return activations, and also to ensure against invalid activations, which might be produced by false signalling, a third and intermediate frequency signal, herein designated as the "Guard" signal, is provided, which will be used in connection with each of such coin collect or return signals. A convenient Guard frequency signal is 2450/c.p.s., being half-way between such two main signals. Thus, for the collect activation, a combination of 2200/c.p.s. and 2450/c.p.s. is used; and for the return activation, a combination of 2700/c.p.s. and 2450/c.p.s. is used. Provision is made for sensing and translatting either of such frequency combinations, as called for. Such combined frequency signals are transmitted over any available metallic line between the Attended office and an Unattended office or offices, thus avoiding need of provision for additional metallic lines between the Attended office and each such Unattended office. Such combined sets of signals, when received at an Unattended office, are delivered to a three tone receiver, supplemental to the P.S.U., unit. By such supplemental tone receiver, D.C. voltages, one positive and the other negative, are developed for the operations of either the coin collect structure or for the coin return structure, of the pre-pay station in question.

The following further explanations respecting the "Three Tone" control system, are pertinent:

According to the presently disclosed system, the operator at the Attended office, momentarily impresses a combination of such control frequencies across the talking circuit. Such combination of frequencies is in turn received by the P.S.U. unit at the Unattended office, and, depending on the frequency of the control signal (collect, 2200/c.p.s.; return, 2700/c.p.s.), thus received, the structures of the Unattended office place a collect or a return D.C. signal potential on the pre-pay station line, being either a positive or a negative signal, as required for the desired operation. Accordingly, under the presently disclosed system and structures, an operator in a main Attended office, may control all of the pre-pay phones in the outlying areas served by the Unattended office or offices, without special trunking. As in presently conventional systems, a brief tone signal is sent to the operator when a pre-pay station dials the operator, to inform such operator that a pre-pay station is calling. Such pre-pay identifying tone signal is passed directly through the Unattended office structures to the Attended office.

The maximum desirable tone signal level for the three tones used to control the return or collect operations of the coin box structure, is about 5 dbm. For accurate reliability, there should be 5 dbm. or greater margin. With a line loss of 15 dbm. the receiver in the receiving station must operate with minus 20 dbm. It must be considered that under emergency conditions a voice frequency component may have this amplitude. Accordingly, provision must be made to ensure reliable operation, even under such unusual conditions as mentioned above. The presently to be disclosed system and structures make provision for meeting such unusual conditions, as well as other unusual conditions which might render the signalling uncertain as to reliability. Such provisions include the following features:

Considering the energy distribution of the voice sounds, it is advisable to use a rather high frequency range for the controls of the return and collect units of the coin box, i.e., 2200 c.p.s. for collect, and 2700 c.p.s. for return, as already stated. Next, the noise characteristics of of speech, averaged over a finite time interval, will have fairly equal components of energy at both 2200 and 2700 c.p.s. Therefore it might be expected that random distributions of such energy would turn on both the collect and return relays. Actually, the electronic circuitry is so arranged that these forces are mutually inhibiting. That is, turning one on depresses the other. Therefore no matter how strong such transients may be, as long as they are reasonably equal, neither the collect relay nor the return relay will operate until the operator's control produces a preponderance of the desired signal frequency. Neither of these two systems is proof against a deliberate attempt to cause false action, such as blowing a 2700 c.p.s. whistle directly into the telephone mouthpiece. A more positive control is provided by use of the guard frequency intermediate between the two signal frequencies e.g., the guard frequency of 245/c.p.s. which lies halfway between the two signal frequencies of 2200/c.p.s., and 2700/c.p.s. Furthermore, the present system requires the presence of adequate levels of both 2450/c.p.s. and 2700/c.p.s., for producing return of the coin, and 2200/c.p.s. and 2450/c.p.s., for collect of the coin.

Provision is made for continuous comparison of the frequency levels of the three frequencies, with a comparison base. This is done by reference to a constant base level, so that differentials activate operating controls. Under the herein disclosed operational structures, no frequency at any level alone, will operate the response relays. The 2450/c.p.s. guard tone alone cannot activate a relay, regardless of the decibel level. If the levels of the 2200, the 2700, and the 2450/c.p.s. signals are all substantially equal (random distribution) no input will activate a relay. To operate the coin collect or return requires a sufficient level of the 2450/c.p.s. guard tone plus one, and only one, of the control frequencies.

Since only one tone signal source is required for an installation of considerable size, it must be built for provision of maximum reliability. It is completely transistorized. The tone generator unit is provided with two completely independent plug-in units each furnishing the required outputs, i.e., 2200/c.p.s., and 2700/c.p.s. When the operator at the Attended Office operates her key, a source line short is removed, and the twin frequency signal for collect or return is impressed on the talking circuit to effect the control at the distant Unattended office, from which the D.C. signals are transmitted to the calling station in question. When not signalling the tone line short is maintained to remove any trace of signal, thus avoiding cross-talk until the moment arrives that the tone signal is actually desired. Numerous independent and de-coupling outputs are provided for corresponding operator positions. Each tone signal can be independently adjusted for production of amplitude of output between minus ten dbm. and plus 10 dbm.; the impedance relationships are such that an essentially constant tone amplitude will be impressed across a line. The tone control system is also provided with fail-safe structures, that is, structures including the following; the output of all tone sources of the first plug-in unit (normally used) is continually monitored; any decrease in its output will cause the output circuits to switch automatically to a second plug-in unit. Any failure of the monitor will cause automatic switch-over. Switchover is indicated by an alarum circuit with suitable alarum signaller, whereupon the first plug-in unit may be removed for repair or substitution. Return may be made to the first or normal plug-in unit either locally or remotely by a momentary push-switch. If the outputs prove satisfactory, the first plug-in unit will remain in the circuit. Otherwise reswitch to the second unit will automatically occur.

The structures which I have provided for carrying into effect various of the operations thus described, include units designed to perform needed functions. Certain of these units are as follows:

THE PRIMARY SWITCHING UNIT (P.S.U.)

The Primary Switching Unit (P.S.U.) has already been described briefly, as respects some of its structures and functions. Included in the functions which it is designed to produce are the following: Various conventional operations include the following: Operations based on the conditions imposed by the answering of the called party; operations imposed by failure of the called party to answer, followed by hang-up of the calling party; time limitations prescribed for some zone pay calls; operations imposed by need of interposition of the attendant at the Attended office; The foregoing conditions imposed in the case of long distance calls both for advising the calling party as to rates, and for advising the attendant as to the amount or value of dropped coins; and for other well understood operations incident to a conventional long distance call.

This unit is placed between the line-finder and the first selector, or between the payphone and the line finder. This P.S.U. includes a step-by-step switching element control, operated by pulses delivered as hereinafter explained. The presently disclosed and illustrated P.S.U. includes means to rotate a cam-carrying shaft, step-by-step through a complete cycle rotation, of 36 steps, produced by corresponding pulses. Such cam-shaft carries eight cams, acting on contacts corresponding thereto, the several cams being constituted to actuate their contacts in connection with circuitry, proper to produce successive functions, needed according to the requirements of the call being served. Provision is also made for arresting the delivery of pulses for arrest of the step-by-step operations, at certain advanced positions or stations of the cycle, until other proper further step signals are produced by the signal producing units, and received by such switching unit, to cause further switch advance. At completion of the full cycle the production and delivery of the pulses is terminated, leaving the step-by-step cam shaft at its original position, from which a later cyclic operation shall commence.

THE TONE GENERATOR

The presently disclosed structures include a tone generator for producing the three tones already referred to. This unit generates such three tones, including the guard frequency, and mixes such guard frequency with each, the collect frequency, and the coin return frequency, for delivery of such mixed frequencies to the attendant's stand, from which they are delivered to further structures as hereinafter explained. I have already referred to the desirability for ensuring correct functioning of the three tone generator for ensuring continuity of dependable service therefrom. The following statement will further disclose the overall operations and the interconnected functions available and/or produced by the structures of such unit:

The circuit system and facilities are such that system operation, both from the standpoint of the pre-pay telephone and the attendant's functions, is similar to corresponding operations of presently conventional pre-pay telephones which are not provided with the improvements herein disclosed.

The tone generator generates the three frequencies, including the Guard frequency, and mixes such Guard frequency with each, the collect frequency and the return frequency. Provision is made, as already stated, to ensure correct and dependable functioning of the structures. The following statement discloses further overall operations, and interconnected functions available and/or produced by the structures of the generator:

The present system and facilities are such that system operation, from the standpoint of the pre-pay telephone, and the attendant's functions, is similar to corresponding operations of presently conventional pre-pay telephones. Although (+) 120 v. D.C. and (−) 120 v. D.C. are used to operate the coin mechanisms of the pre-pay telephone, they will be so operated under control or activation of the tones. The actuating currents will continue to be compatible with presently conventional installations. The following statements will evidence the validity of the foregoing statements:

When the pre-pay hand-set is raised from the hook and money is deposited, the dial tone is received to indicate that the system is prepared to receive the dialing impulses. The present improvements are such that they may be included in systems wherein the dial tone comes on without need of dropping a coin, or wherein the coin is dropped prior to dialing. If, when the desired number has been dialed by the calling party, a busy signal is received, the money will be returned upon disconnect, by restoration of the receiver to the hook. A dialing unit is incorporated, which includes provisions such that when the "0" or high dialed position is dialed, two operations are performed upon the answering of the attendant, as follows: (1) The coin is returned, and (2) a tone is placed on the line informing the attendant that the calling telephone is a pre-pay unit. (Note: Each operator position requires a control unit which provides the control of coin frequencies already referred to. This control unit also includes the tone generator.) The collect operation by the operator, produced by her key, places the dual tones of 2200/c.p.s. and 2450/c.p.s., on the lines to the Unattended office. Otherwise, the coin return operation, produced by the alternate operation of the operator's key, places the dual tones of 2700/ c.p.s., and 2450/c.p.s., on the lines to the Unattended office. The reception of either set of dual tones at the Unattended office, will be recognized by the P.S.U., with production of a voltage by the tone receiver, of proper polarity (either +120 v. D.C., or −120 v. D.C., as the case may be), such D.C. voltage being applied to a polarized relay mechanism at the pay phone, for either collect or return of the coin(s), as the case may be.

In case a pay call is delayed, the operator at the Attended office may instruct the caller to hang-up, and that she will call the caller back. This operation results in loss of the connections of the pay phone through the circuitry; but the operator at the Attended office will later reach the calling pay phone by dialing the number thereof. This dialing by the operator passes proper signals through the sequence of selector stages, and through a final connection, to the calling pay phone lines. These connections include the unit which provides the operator with the means to control the coin collect or coin return operations.

To more readily understand the various operations, and the structures to be hereinafter described in detail, the following further descriptions of certain units and structures is now pertinent; but it will be understood that such descriptions of the structures thus revealed, are given by way of illustration, only, and not by way of limitations:

The following assumptions are made respecting the tone generator: 48 v. D.C., plus or minus 5 v.; frequencies, 2200/c.p.s., 2450/c.p.s., and 2700/c.p.s., providing—2200/c.p.s and 2450/cp.s., for collect operations, and 2700/c.p.s., and 2450/c.p.s., for coin return functions. Suitable amplification means is provided. Since the guard frequency (2450/c.p.s.) is used for both the coin collect and the coin return operations, the guard frequency oscillator should be provided with extra amplifier means. The outputs delivering the mixed frequencies are amplified, and each such mixed frequency delivery means delivers through a corresponding transformer having a double winding secondary. One each, of such double windings serves as the output winding to deliver corresponding tones to the operator position. The other of each of such double windings delivers an A.C. voltage to the fail-safe unit. Provision is made for bringing the stand-by tone generator into service when there is a failure of functioning of the main tone generator; and at the same time an alarum is activated to indicate the failure of the main generator to function properly.

The operator position in the Attended office includes two three-position lever keys, one for the front cord, and the other for the rear cord. Shift of the proper key in one direction from its central position connects the proper tone supply lines for collect; shift of such key to the opposite directional position from its central position connects the other supply lines for coin return. Protection against spurious pick-up of either tone signal is prevented when the key is in its central position.

The following comparison of the presently disclosed system with presently used conventional equipment, is pertinent, including the following comments:

Post-pay systems and pre-pay systems of conventional form, are well known and need no description here; but broadly stated, pre-pay systems and operations present various substantial advantages over post-pay systems. Some of such advantages lie in the field of human relations, but are important when viewed from the standpoint of relations between the customer or subscriber, and the operating company. Nevertheless, previously known pre-pay structures and operations, when considered with respect to calling stations located considerable distances from an attended office require full metallic lines of sufficiently small resistance to avoid unacceptable voltage drop when transmitting operational currents to the coin collect and coin return structures of the pre-pay stations, to ensure dependable operations of such coin collect and coin return units. The presently disclosed system, wherein the metallic lines for such purposes are comparatively short (extending only from the unattended office to the pre-pay station in question), with control frequencies to activate the delivery of the coin collect and/or coin return currents from the unattended office a short distance to the pre-pay station, with such control frequencies delivered over conventional lines from the attended office to the unattended office, present manifest advantages, over presently conventional systems, both from the standpoint of original installation costs, and the standpoint of upkeep and dependability of operation. These advantages become emphasized when it becomes necessary or desirable to provide the pre-pay installations and operations, in less populated areas, such as exist in many locations adjacent to large cities and other highly populated areas.

It will also be evident that conversion operations, to convert previously existing post-pay installations, to the pre-pay type, are greatly simplified by use of the equipment and the operations herein disclosed, and that the costs of such conversions may be materially reduced by use of the presently disclosed structures.

Other objects and uses of the present invention, will appear from a detailed description of the same, which consists in the features of construction, and combinations of parts, hereinafter described and claimed.

Figure 1:
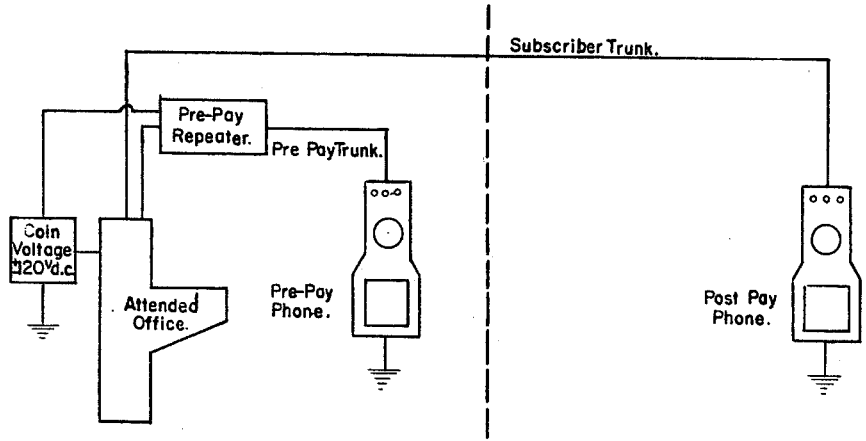
Figure 6:
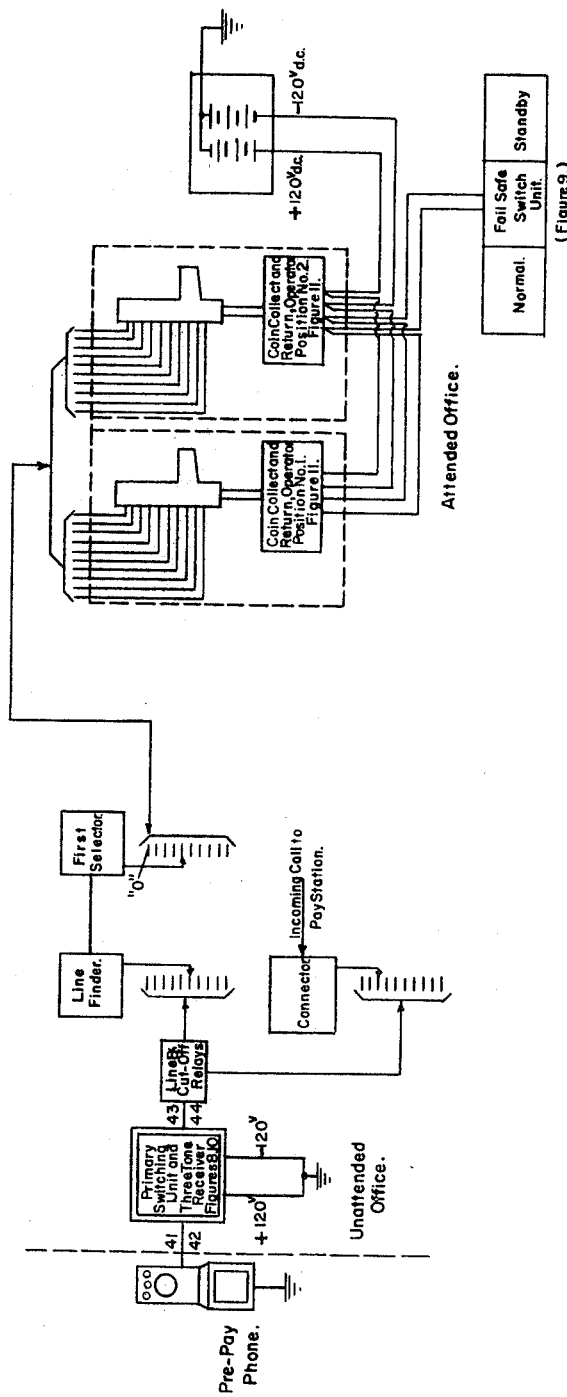
Figure 7:
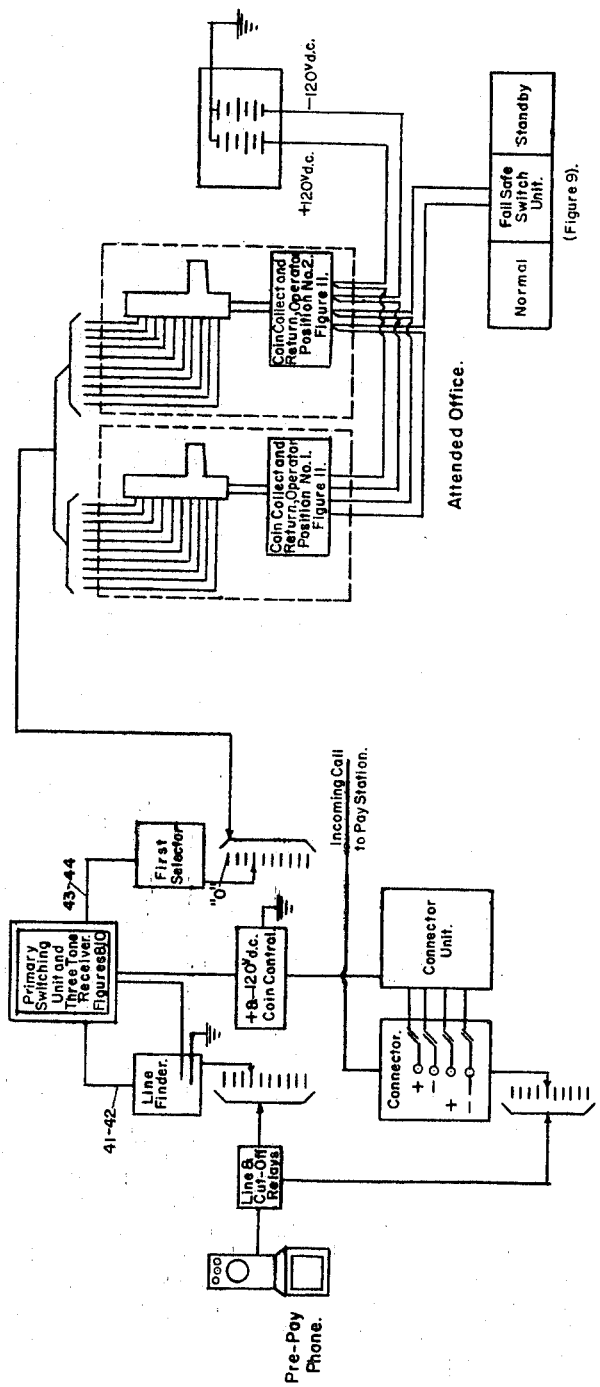
Figure 8:
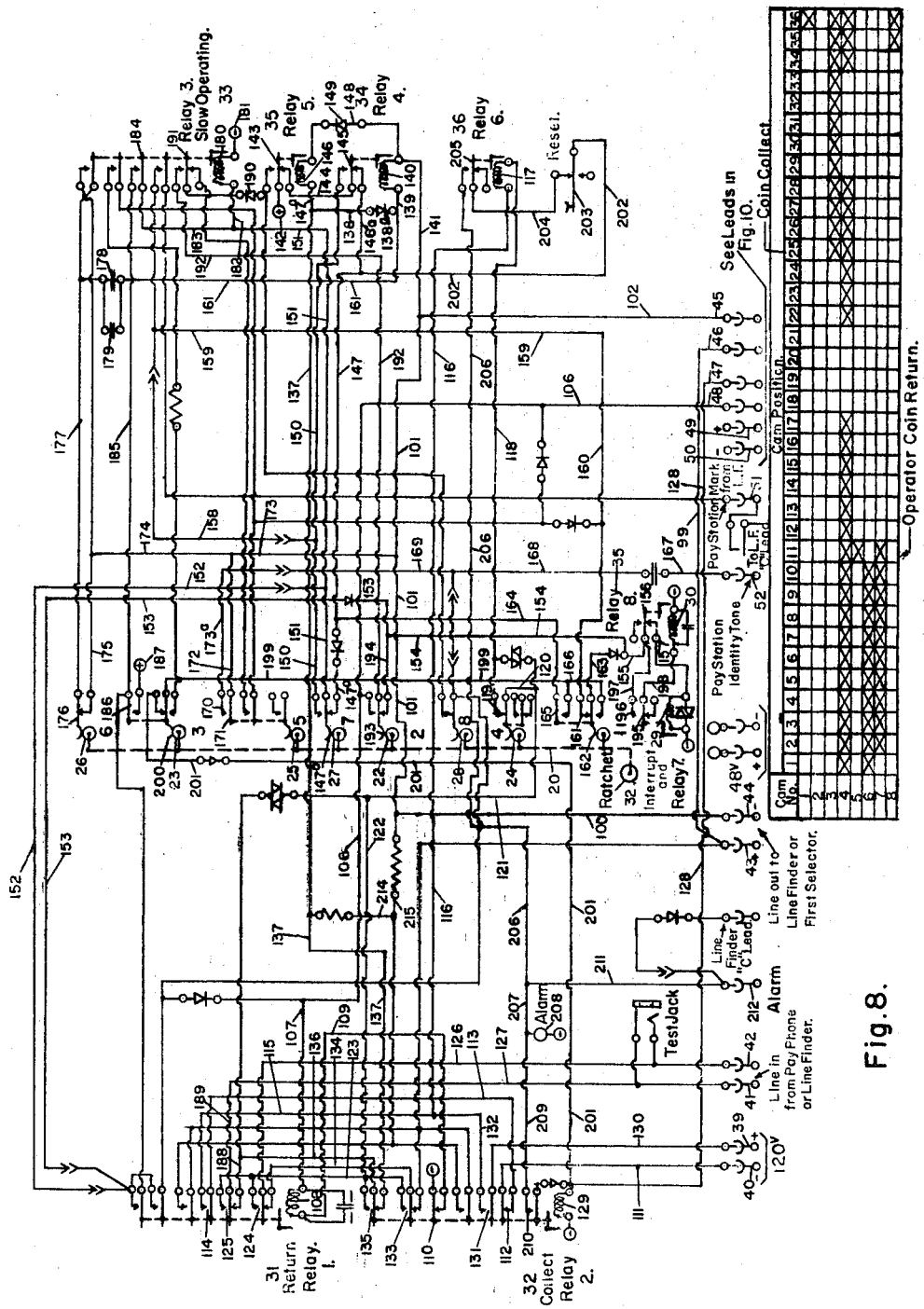
Figure 9:
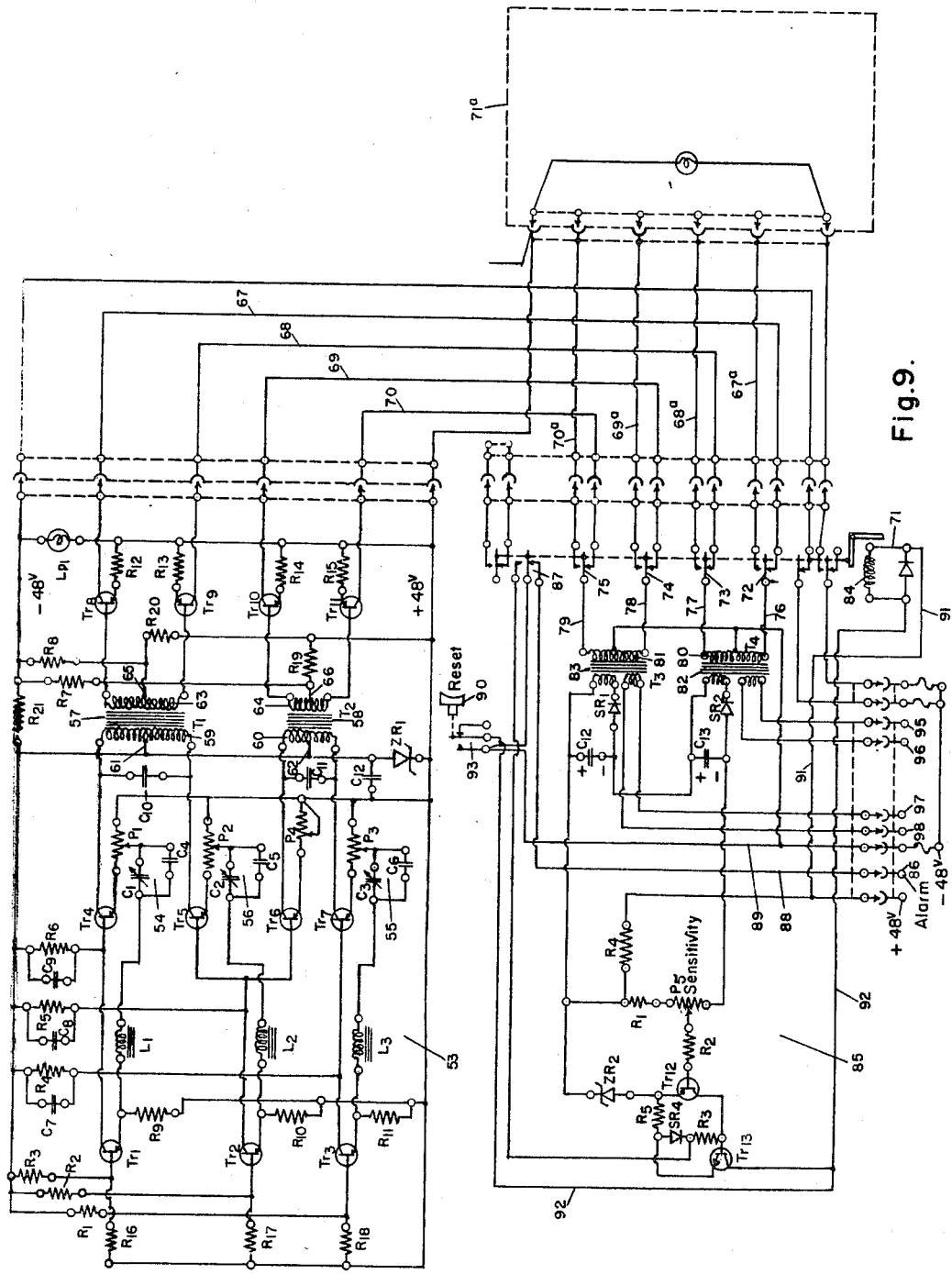
Figure 10:
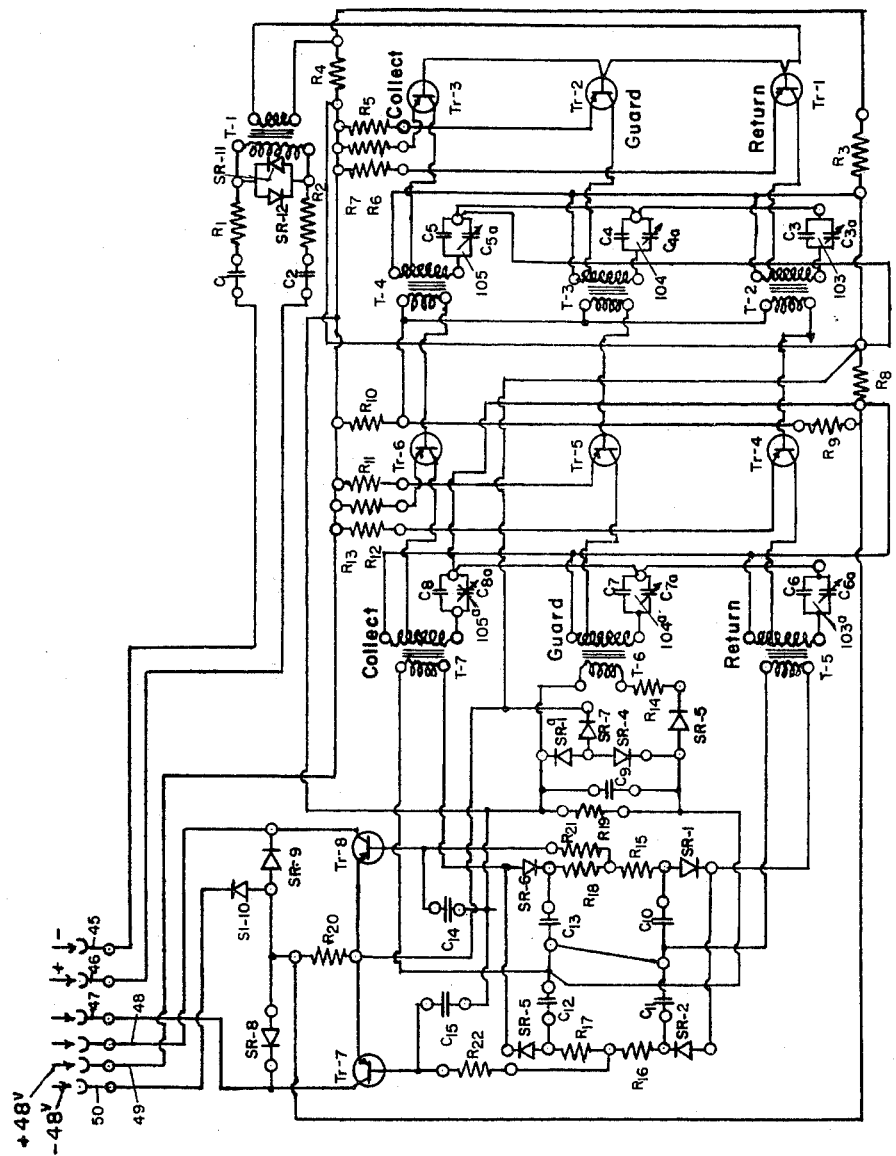

In the drawings:

FIGURE 1 shows schematically and in outline, a simple pay system of conventional form, including a conventional pre-pay local telephone station connected to the attended office; together with a conventional post-pay telephone station, located at a considerable distance from such attended office, and connected thereto by conventional full metallic lines;

FIGURE 2 shows schematically and in outline, a single pre-pay local telephone station connected to the attended office, together with incorporation of features of my present invention including an attended office serving a local pre-pay telephone station by conventional metallic lines; and also serving an outlying area located a considerable distance from such attended office, which attended office includes the threetone activation signal producing and sending equipment; such local area being served by an un-attended office which includes the primary switching unit (P.S.U.), already referred to, and includes the control signal activation receiving and translating equipment, and the means to produce and emit to the pre-pay coin units, the D.C. signals for return or collect, under control of elements of the P.S.U., already referred to; it being noted that a full metallic trunk line is not needed, extending from the attended office to such unattended office, since the tone signals transmitted from the attended office to the unattended office may be sent over any conveniently available line, such as a conventional talking line; and since the coin return and/or collect signals need be sent only a comparatively short distance from the unattended office to the pre-pay telephone station in question;

FIGURE 3 shows diagrammatically, an assumed area of considerable size, served by an attended office, together with a group of local or satellite areas surrounding such attended office and its area; each such local area being connected conventionally, to the local operater at the central or attended office, by a conventional operator trunk; it being noted that under such previously conventional system, each of the local or satellite areas is under direct control of the pre-pay operator at the attended office over operator trunk lines, thus requiring full metallic lines extending the considerable distances between such central attended office and the locations of such pre-pay telephone stations;

FIGURE 4 shows on enlarged scale, a portion of the showing of FIGURE 3, comprising the central attended office area, and portions of sub-areas or satellite areas, VII, III, and VI; together with certain of the conventional units, including line-finders, selectors, etc.; thus showing in elementary form a presently conventional system for supplying the needs of the satellite areas illustrated;

FIGURE 5 shows, also on enlarged scale as compared to FIGURE 3, a portion of the equipment to serve the needs of one of the pre-pay stations according to the improved structures and operations herein disclosed; such figure showing the P.S.U., the use of conventional lines extending from the attended office (not shown in this figure), to the P.S.U. of the unattended office, shown in this figure; and also showing the source of D.C. for operating the coin return and coin collect units of the pre-pay station, under control of the P.S.U., and other related equipment;

FIGURE 6 shows on still more enlarged scale, as compared to previous figures, schematically, portions of an attended office serving its local area, and also serving distant satellite sub-areas which include pre-pay stations; one such sub-area pre-pay station being shown; such sub-area including an unattended office embodying the features already briefly disclosed; the attended office also including the structures provided for generating the three tone signals which are transmitted to the unattended office and there used, through the agency of the P.S.U., and other equipment, which other equipment includes a three tone frequency signal receiver and translating unit for activating the D.C. signal producing elements for transmission of such D.C. signals to the pre-pay station coin box elements being served; the arrangement shown in this figure being one in which the P.S.U. is located between the line-finder and the pre-pay station;

FIGURE 7 shows a schematic showing similar to that of FIGURE 6; but in the present case the P.S.U. is located between the first selector and the line-finder, with such line-finder located between the P.S.U. and the pre-pay station;

FIGURE 8 shows a wiring diagram for a typical P.S.U. unit, such as previously referred to herein; the step-by-step cam operative section being shown centrally of the figure for convenient showing of the various circuits controlled by the eight cams carried by the cam shaft; and this figure also includes a tabulation relating the 36 steps of a complete cycle of operations, to the functional operation of each cam and its contacts; such functional operation of each cam and its contacts being identified by the crossed block relating the shaft stepped position to each of the eight cams;

FIGURE 9 shows a typical wiring diagram for a three tone generator embodying the features already briefly described; only one of the generators being shown by full wiring, the other generator being indicated by the dashed block; and this figure also shows the fail-safe unit and related elements, serving to ensure continuity of service by transfer of the tone generating and delivering operations, to the stand-by section in case of imperfect operation or failure of the main generating section:

FIGURE 10 shows a wiring diagram for a typical three tone receiver, located at the unattended office, or the pre-pay receiver; and FIGURE 11 shows a typical wiring diagram for a two position operator-stand, including the key actuated contacts for delivering impulses of either the coin return or the coin collect activation frequencies (with included guard frequencies), such impulses being delivered over an available wire line to the unattended office, for delivery to the control frequency receiver and translator, and thence back to the P.S.U. for delivery to the coin return or coin connect units of the pre-pay station, as the case may be.

FIGURES 1 and 2, show in outline a simple presently conventional installation including an attended office operator's stand, a pre-pay telephone station close to such attended office, and a second post-pay station located distant from such attended office, and connected to such office by a conventional subscriber's trunk. Noting that such distant station is of the post-pay type as shown in FIGURE 1, it is assumed that it is desirable to transfer such distant telephone pay receiver, to a pre-pay operation. FIGURE 2 shows the attended operator's stand at the attended office, the close at hand pre-pay receiver station, and the distant telephone station; but now, in FIGURE 2 such distant station has been converted to a pre-pay operation, according to the features of invention, and the operative elements herein disclosed, as follows:

The operator's stand at the attended office remains, the pre-pay phone close to such attended office is retained, and the pre-pay repeater for such close at hand pre-pay phone is retained; but changes and/or substitutions have now been made, including the following. Since the operational signals needed to actuate the coin return and coin collect units are sent to such units from the unattended office, the primary switching unit is shown in the satellite area, with provision for delivering the needed D.C. signals to the pre-pay phone, under control of the three tone sonic signals sent from the attended office operator, over available lines, and without need of provision of a dedicated metallic line from such attended office to the unattended office. It is noted that in FIGURE 2, provision is made for supply of 120 v. D.C. coin voltage, but that supply serves the pre-pay phone close to such attended office, and is not used for delivery of the necessary coin return and coin collect units within the distant satellite area. On the contrary, there is shown, proximate to the primary switching unit (P.S.U.) of the satellite area and its unattended office, the supply of coin voltage (120 v. D.C.) connected to such P.S.U. and supplying the needs of the pre-pay coin units connected to and controlled by, such P.S.U. of such unattended area. Thus the line extending between the attended office of the central area and such unattended office of the satellite area, may be the conventional voice carrying line or lines, and without need of a line dedicated to carrying the currents required for operation of the coin return and coin collect units of the pre-pay phone or phones of such satellite area.

The showing of the diagram of FIGURE 3 illustrates in striking manner the relationship between a centrally placed "Main Office," serving a number of surrounding satellite offices; the sub-offices of such satellite areas being shown by the circles in such satellite areas. By installation of the structures and operations herein disclosed, for such a series of satellite areas, related to such Main Office, the unattended offices are located at such circled locations, to serve such pre-pay phones as are contained in the satellite areas, supplying the necessary D.C. signals for coin box operation of such pre-pay phones, over comparatively short metallic lines of capacity to deliver the D.C. operational signals without excessive line drops of voltage to any such pre-pay phone; each such locally placed unattended office being connected to the Main Office by conventional talking lines, with the three tone signals imposed on such conventional talking lines, and without need of provision of a dedicated line between the Main Office and any one of the satellite unattended offices.

FIGURE 4 shows on larger scale, and also schematically, a portion of the system shown more scantily in FIGURE 3; and FIGURE 5 shows a fragment of the showing of FIGURE 4, but with the features of the present invention incorporated in the satellite area unattended office, in the form of the P.S.U., a source of 110 v. D.C. serving such P.S.U. and related elements, the three tone generator (located at the main or attended office) not being shown, but the available talking lines which connect such unattended office to the attended office, being shown connected into the P.S.U. for delivery of the three tone signals to such unattended office as already explained. It is noted that in the showing of FIGURE 5 the unattended office is located between the line finder and the pre-pay phone in question.

FIGURE 6 shows in more detail, schematically, a typical system embodying the present inventive features, wherein the unattended office in placed between the line finder and the pre-pay phone; and FIGURE 7 shows another typical system similar to that shown in FIGURE 6; but in the present case the unattended office is located between the first selector and the line finder, with the pre-pay phone beyond such line finder. These two showings will be considered together, as follows:

In each case provision has been shown for two operator-stands (located at the attended office). Each of these stands is of the form shown in FIGURE 11 to be hereinafter described in detail. Each of these stands includes switching key means to enable the operator to deliver either the coin collect or the coin return tone signals to the line extending to the unattended office which serves the pre-pay phone in question. Accordingly, provision is made for supplying the mixed tones for coin collect, and the mixed tones for coin return, to each stand, so that either of such tone mixtures may be placed on the line leading to the unattended office, as needed, by simple key operations. In FIGURES 6 and 7, such tone producing and mixing units are shown by block diagram; and the circuitry of such tone generators and mixers is shown in detail in FIGURE 9, to be hereinafter described in detail.

In each of such FIGURES 6 and 7 there is shown, by block diagram, the P.S.U., and provision for supplying both +120 v. D.C. and −120 v. D.C., to the P.S.U., for control and delivery of the one or the other as required, to the pre-pay phone in question, connected to such unattended office by comparatively short metallic lines, and thus under the condition of acceptable voltage drop at the receiving (coin unit) point of delivery of such D.C. operational signals. FIGURES 6 and 7 also show, schematically, simple arrangements for enabling the pre-pay phone to receive incoming calls, and for various conventional operations, well understood in the art.

Reference will next be made to FIGURE 8 (showing the circuitry of the P.S.U.); 9 (showing the circuitry of the three tone generator, fail-safe unit, and related elements); 10 (showing the three tone receiver, located at the unattended office and constituted to receive either the coin return tone mix, or the coin collect tone mix, and activate proper elements to deliver the corresponding positive or negative 120 v. D.C. to the lines leading to the pre-pay phone in question); and 11 (showing the typical operator's stand at the attended office, provided with key operated switching facilities for delivering the proper tone mixtures to the lines leading to the unattended office.) These several units are described as follows:

THE PRIMARY SWITCHING UNIT (P.S.U.)—FIGURE 8

This unit includes a step-by-step advanced cam shaft 20 carrying the eight cams 21, 22, 23, 24, 25, 26, 27 and 28, designated 1, 2, 3, 4, 5, 6, 7 and 8, for convenience of reference. Each of such cams controls corresponding contacts or groups of contacts, some of which will be referred to hereinafter. In FIGURE 8 such camshaft and cams are shown in their normal or unactuated positions, with their contacts also in such normal or unactuated positions. The cam shaft is driven step-by-step always in the same direction, by pulses delivered to the solenoids 29 and/or 30, acting to drive the ratchet on such cam shaft, step-by-step in conventional manner. Thirty-six steps produces a complete cycle of the cam shaft rotation, bringing it back to its initial or normal position, with cut-off preparatory to production of a succeeding cycle. Provision is also made for stopping the pulsing at one or more stations during such cycle, by arrival of stopping signals, or discontinuance of normal pulsing. Such stoppings are for the purpose of controlling the emission of various signals during the cycle, such as during coin return, coin collect, and the like.

For purposes of convenience of structure, and other reasons, certain relays are included in the assembly of such P.S.U., as shown in FIGURE 8. These include the coin "Return Relay 1," the coin "Collect Relay 2," the "Relay 3 Slow Operating," the "Relay 4," the "Relay 5" and the "Relay 6." Each such relay operates a contact or group of contacts, some of which will be described hereinafter. Included are also the "Relay 7" identified as "Interrupt" and the "Relay 8," both of which comprise portions of the stepping structures. The above relays are identified by the parts numbers 31, 32, 33, 34, 35, 36, 37 and 38, respectively.

D.C. 120 v. plus and minus input terminals 39 and 40 supply the D.C. needed for operation of the coin units. The conventional telephone lines, incoming connect to the terminals 41 and 42, legended as "Line in from Pay Phone or Line Finder"; and conventional telephone lines, outgoing connect to the terminals 43 and 44, legended as "Line out to Line Finder or First Selector. Terminals identified as 45, 46, 47, 48, 49 and 50, in FIGURE 8, connect to like numbered terminals shown in FIGURE 10, being the three tone receiver for activating tones received from the attended office, for activation of the coin collect or coin return functions of the pre-pay phone. The terminal 51 identified as "Pay Station Mark from L.F.," delivers the identifying tone which is conventionally used to identify a pay station, to the operator at the attended office, and the terminal 52 legended as "Pay Station identity Tone" supplies such identifying tone to the P.S.U.

At the lower portion of FIGURE 8 there is included a tabulation showing the operative relationship of the various cams of the cam shaft, as determined by the successive steps of the ratchet driving such cam shaft, the operativeness of any particular cam at a specified step being indicated by the presence of a cross at the corresponding intercept. Accordingly, the following cam and corresponding contact operations are noted:

At step 36, being the terminal step of the preceding cycle, at which step, the parts were left until the commencement of the present cycle, cams 1, 3, 4 and 8 were left in activated position. Upon receipt of the first pulse of the present series, (identified as "Cam Position" 1), cams 1, 3 and 8 were dropped, leaving cam 4 still operative; and cam 6 was picked up, causing cams 4 and 6 to be operative. Pulse 2 brings in cam 7, so that cams 4, 6 and 7 are now operative. This condition obtains until pulse 11 is produced, whereupon cam 6 is dropped and cam 5 is picked up. As legended on the tabulation, the "Operator Coin Return" may be produced at this position of the cam shaft. Pulse 12 causes dropping of cams 4, 5 and 7, leaving only cam 4 operative. This condition obtains until pulse 17 arrives, when cam 4 is dropped, leaving all cams inoperative until pulse 22 arrives, when cam 4 is again activated. This condition obtains until pulse 25 arrives, and when cam 3 is activated. The chart is legended "Coin Collect" at the position of pulse 25. Both cams 3 and 4 remain activated until pulse 29 arrives, when cam 4 is again dropped, leaving only cam 3 activated until pulse 34 arrives. Then cam 4 is again activated. Both cams 3 and 4 remain activated through pulse 36, cam 8 being additionally activated by pulse 35 and remaining activated through pulse 36, when cam 1 is activated. Thus cams 1, 3, 4 and 8 remain activated at termination of the cycle. This combination of activation of the cams is in force until the first pulse of the succeeding operation, arrives.

The line "in" from the pre-pay phone, shown at the terminals 41 and 42 (FIGURE 8), and also shown and numbered between the pre-pay phones and the P.S.U., in FIGURES 6 and 7, which connect such calling pre-pay phones with the P.S.U., will deliver to such P.S.U. (FIGURE 8), all of the pulses produced by the calling station at commencement of a pre-pay call. Such pulses include a first pulse produced when the receiver is raised from the hook. This first pulse will produce the activation of the cam shaft to the position 1 shown in the chart of FIGURE 8, thus activating the cams 4 and 6 as shown on such chart. Such pre-pay phone is provided with a dialing unit which is so constituted that when dialed to its high or 0 position a special switch, comprising a portion of such dialing unit, is moved to its open contact position, where it remains until the dialing unit's finger piece has returned to its initial or original position. Such special switch comprises a portion of the pre-pay telephone unit's circuitry and is included in a short circuit connection which also includes a conventional relay (sometimes called the "ten cent relay"). As long as such ten cent relay remains closed, and in the absence of the special switch just referred to, the dialing unit is shorted, and unable to deliver pulses, this being a conventional operation. However, the special switch above referred to is included in such short circuit connection, so that by moving the dialing unit (of the present circuitry) to its open circuit position (by dialing to "0") such short across the pulsing contacts of the dialing unit, is removed; and as such dialing unit then moves to its starting position (the finger piece having been released), ten pulses will be delivered; without need of first depositing the conventional dime to activate the "ten cent" relay for removal of the short across the dialing unit's contacts. Such a dialing unit, and related circuitry, are shown in letters patent of the United States, No. 3,221,101, issued to me Nov. 30, 1965 (see FIGURES 3, and 7 to 25), and in a co-pending divisional application based on said issued patent, and allowed for issue.

It is thus evident that the raising of the receiver of the pre-pay phone from its hook, and the dialing of the above dialing unit, to its high or ten position, with release back to its zero position, will result in delivering eleven pulses to the cam shaft operating solenoid, with corresponding advancement of the cam shaft to position 11 shown in the legend. During such ten dial-produced pulses, the cam shaft will hold cams 4, 6 and 7 activated (during nine of the pulses), and on the tenth dialing pulse, cam 6 will be dropped, and cam 5 will be picked up, so that at conclusion of the dial pulsing cams 4, 5 and 7 will be activated (being position 11 of the legend). All such operations will place the calling party in connection with the operator at the attended office. Then the calling party may request information as to the charge for the call to be made. Provision is also included for delivering to such operator a special tone signal indicating that the call is coming from a pre-pay station of the present type. Such identifying signal comes to the P.S.U. over the connection 52, shown in FIGURE 8. Such identifying signal will reach the operator at the attended office from the calling station over the input connection 52 and line 101$^a$ (FIGURE 8), to the stationary contact and tongue 101$^b$ of the cam 5 (now engaged at cam position 11), thence over the lines 101$^c$ and 101$^d$ to the lines 101 and 100 (FIGURE 8), is being remembered that cam 5 has been picked up at position 11, thus making possible the above operation to the line 44 which is connected to the attended office at the time (see FIGURES 6 and 7).

The terminals 45, 46, 47, 48, 49 and 50 (FIGURE 8), connect to like numbered terminals of the three-tone receiver (FIGURE 10), presently to be described; such three-tone receiver being located at the unattended office, and connected to the P.S.U. by short lines.

Reference has been made to the fact that when the cam position 11 is attained, coin return may be produced by the attended office operator. Examination of FIGURE 8 also shows the legend "Coin Collect" leading to the cam position 25. During the interval between the cam positions 11 and 25 the call was completed, and the talking interval was started. Various operations during this interval will be explained in detail hereinafter. It is noted that pulses needed for operations occuring during the talking interval are produced under controls other than the dialing unit operations at the calling station.

THE THREE TONE GENERATOR—FIGURE 9

This unit includes two three tone generators of identical circuitry and functions, together with an interconnected fail-safe section and tone delivery section. These groups are identified in FIGURE 9 as follows: One of the three tone generators is detailed by the circuitry of the area 53 having the two oscillators 54 and 55 for generating the two main frequencies, and the third oscillator 56 for generating the guard frequency. The two transformers 57 and 58 are each provided with double primary and secondary windings, the double primary windings being shown at 59 and 60, centrally tapped at 61 and 62, and the double secondary windings 63 and 64, centrally tapped at 65 and 66. Accordingly, the transformer 59 will mix the frequencies delivered by the oscillators 54 and 56, and the transformer 58 will mix the frequencies delivered by the oscillators 55 and 56. The terminal lines 67 and 68 deliver one of the mixed frequencies, and the terminal lines 69 and 70 deliver the other mixed frequencies.

The above description of one of the generators for delivering the two frequency mixtures for return of the coin, or for collect of the coin, is duplicated by a second generator of identical circuitry and elements; and for purposes of simplicity of illustration, such second generator is schematically shown by the block 71ª in FIGURE 9. The tone delivery leads 67ª, 68ª and 69ª and 70ª from such duplicate generator, correspond to like numbered leads already referred to. Both sets of leads are carried to the contacts of the relay 71, as follows: The leads 67 and 67ª to the contacts 72; the leads 68 and 68ª to the contacts 73; the leads 69 and 69ª to the contacts 74; and the leads 70 and 70ª to the contacts 75. Accordingly, with the relay 71 un-energized, as shown in FIGURE 9, the leads 67, 68, 69 and 70 will deliver their frequencies generated by the section 53, to the leads 76, 77, 78 and 79, connected to the terminals of primaries 80 and 81 of the transformers 82 and 83. On the contrary, when the relay 71 is energized, with corresponding shift of its tongue contacts, the leads 67ª, 68ª, 69ª and 70ª, will deliver their frequencies generated by the section 71ª, to the leads 76, 77, 78 and 79 connected to the terminals of such primaries 80 and 81 of such transformers 82 and 83. Such energization of the relay 71 is produced by electrification of its solenoid 84, produced by the fail-safe, monitoring section 85, previously referred to herein, or by the test or re-set switch 90, hereinafter described.

An alarm signal is provided for indicating a switch-over from the generating section 53, to the generating section 71ª. The terminal 86 connects to the contacts 87 shown in FIGURE 9, which comprise a portion of the relay 71, such connection being produced by the line 88, and the tongue of such contacts 87 being connected to the negative side by the line 89. Since such contacts 87 are normally closed (as shown in FIGURE 9), the alarm signal is continuously given (during normal operation), until switch-over occurs, whereupon the opening of the lower contact of such pair 87 will terminate the alarm signal, with corresponding indication that switch-over has occured. A re-set button or switch 90 is provided for temporarily restoring the tone delivery operation, to the main tone generator, for test purposes. Such testing operation is produced as follows:

One end of the relay solenoid 84 is connected to the positive side of a 48 v. D.C. supply, by the line 91, the other end of such relay solenoid being connected to the tongue of the switch 93, and the contact of such switch 87 being connected to the negative line 89. Accordingly, depression of the re-set button 90 will produce momentarily shift-over from the main tone generator, to the stand-by or fail-safe generator; such test operation, manually produced, being an operation supplemental to the shift-over operation automatically produced by the monitoring section 85.

The terminals 95 and 96 deliver one set of tones (e.g., for coin return) to the operator's stand (shown in FIGURE 11), and the terminals 97 and 98 deliver the other set of tones (e.g., for coin collect) to the operator's stand. Corresponding identifying numerals are applied to incoming terminals of such FIGURE 11 (operator's stand).

THE THREE TONE RECEIVER (FIGURE 10)

This unit, located at the unattened office, and supplementing the P.S.U., is used in direct association with such P.S.U. Comparison of FIGURES 8 and 10, will disclose the set of terminals 45, 46, 47, 48, 49 and 50, in each case, such terminals being given like numerals in the two figures. Thus, connection between live numbered terminals in such two figures will produce proper interchanges of signals betwen the P.S.U., and the three tone receiver. It is noted that the terminals identified by the numerals 41 and 42 of FIGURE 8 are legended "Line in from Pay Phone or Line Finder" and that the terminals identified by the numerals 43 and 44 of such FIGURE 8 are legended "Line out to Line Finder or First Selector." Reference to FIGURES 6 and 7 discloses two arrangements of the location of the P.S.U., with respect to the pay phone, the P.S.U, and the line-finder and the first selector. Accordingly, when the terminals 41 and 42 of FIGURE 8 are connected to the pay phone as in FIGURE 6, the terminals 43 and 44 of FIGURE 8 are connected to the line-finder (through the cutoff relays); but when such terminals 41 and 42 of FIGURE 8 are connected to the line-finder as in FIGURE 7, the terminals 43 and 44 are connected to the first selector, also as shown in FIGURE 7. It is also seen from such FIGURES 6 and 7 that the tone signals (either the coin return-guard pair, or the coin collector-guard pair), are delivered to the P.S.U. through such terminals 43 and 44 of FIGURE 8, being received from the operator's stand shown in FIGURE 11, over the conventional telephone lines extending from the attended office, to the P.S.U. at the unattended office.

THE OPERATOR'S STAND—FIGURE 11

This unit is located at the attended office. It is provided with operator controlled cord and key stands, which are conveniently of general arrangement used at the present time, but are re-designed and provided with circuitry needed to meet the special operations imposed by the novel operations herein disclosed. Accordingly, provision is made for delivering the coin return and the coin collect tone signals to the key operated switching facilities of the present unit. This is done in manner to prevent improper delivery of the tone signals to the telephone lines leading to the unattended office, by shorting both the coin collect signal lines, and the coin return signal lines, with provision for removal of the short on the signal lines to be used for delivery of the selected signal, to the P.S.U., incident to producing a coil return or a coin collect operation.

In FIGURE 11 I have shown the two switch units 1 and 2. Each of these includes the movable stem, 216 or 217, normally biased to its centraly unmoved position, shown in the figure, and movable in either direction by operator key. For convenience of illustration I have shown the block 218, legended "Tone Generator" (referring to the unit shown in FIGURE 9). The leads 67 and 68 supply the coin collect signals from such generator, to the unit of FIGURE 11, and the leads 69 and 70 supply the coin return signals from such generator, to such unit of FIGURE 11, such leads of FIGURE 11 being thus numbered the same as corresponding leads shown in FIGURE 9. Also the transformers 82 and 83 (shown in FIGURE 9) are shown in FIGURE 11 with like numbering, and the coin collect lines, and the coin return lines, 95 and 96, and 97 and 98, respectively, of FIGURE 9, as shown in FIGURE 11, under like numberings in each case. The coin return signal lines 97 and 98 are normally shorted together by the lines 219 and 220, including the key operated switches 221 (coin return) and by the lines 222 and 223, including the key operated switches 224 (coin collect). Operation of the operator's keys in proper manner serve to remove the short from the selected pair of lines (either coin return, or coin collect), and to connect such lines to the telephone lines extending to the P.S.U., and thence to the control signal unit of FIGURE 10, where the received signals of transmitted frequency produce response, and are translated and transmitted to the P.S.U.

Examination of FIGURE 8 shows the terminal 43 connected to the terminal 46 by the line 99, and terminal 44 connected to the terminal 45 by the lines 100, 101 and 102. Accordingly, in each of the arrangements shown in FIGURES 6 and 7, the coin-control tone signals, emitted at the operator's stand at the attended office, and delivered to the P.S.U. over the conventional telephone lines, is directly transmitted to the tone receiver unit of FIGURE 10, for processing therein, without modification by the units of such P.S.U.

The tone signals thus delivered to the tone receiver of FIGURE 10, are identified by the resonant response elements 103, 104 and 105 (FIGURE 10), and are transmitted by the circuitry of such FIGURE 10 to produce either the coin return activating signal delivered by the terminal 48 of FIGURE 10 to the like numbered terminal of FIGURE 8; or the coin collect activating signal delivered by the terminal 47 of FIGURE 10 to the like numbered terminal of FIGURE 8. The thus delivered activating signals, respectively activate the relay 31 (for the coin returns), FIGURE 8, or the relay 32 (for coin collect), FIGURE 8. Such relays control the delivery of either negative 120 v. D.C. from the input terminal 40 (FIGURE 8), or positive 120 v. D.C. from the input terminal 39 (FIGURE 8), to the terminals 41 and 42 to which are connected the lines extending to the pre-pay telephone. The circuitry of FIGURE 8 to produce these operations will be explained hereinafter.

The release of the hook by raising the receiver produces a primary pulse which controls production of a secondary pulse. This secondary pulse advances the cam shaft 20 from its terminal position 36, shown on the legend of FIGURE 8, to the cam position 1, also shown on such legend. The circuitry of FIGURE 8 by which these operations are produced, is as follows:

The rising of the calling telephone's hook produces an interruptable circuit through the P.S.U. through the telephone loop extending to the attended office, as follows: From the telephone line which extends from the calling station to the P.S.U., to the positive terminal 41 of the P.S.U. (FIGURE 8), line 127 to the tongue of the contacts 125 (relay 31) to the lower stationary contact (such relay contacts being closed), line 136 to the tongue 135 of relay 32 (closed contacts), lines 137 and 138, diode 138ᵃ, line 139, solenoid 140 of relay 34, and lines 141, 101 and 100, to terminal 44 of the P.S.U. Such terminal connects to one of the telephone lines extending through the line/finder and/or selector, to the operator's stand of the attended office. The circuit thus traced will remain operative (subject to other controls), during the pulsing produced by the dialing unit.

The above primary pulse will produce a secondary pulse as follows:

The energization of the solenoid 140 of relay 34 engages its tongue 145 with the companion upper stationary contact. Such tongue connects by the line 144 with the lower stationary contact of the tongue 143 of relay 35, and such tongue receives positive input from the terminal 142. Accordingly, a circuit is produced as follows: Positive input from terminal 142 through tongue 143 of relay 35, lower companion stationary contact of such tongue, line 144, tongue 145 of relay 34, upper contact of such tongue, lines 150, 158, 159 and 160, top stationary contact 161 of cam 1 (still activated—see cam position 36 of legend, FIGURE 8), tongue 162 of said cam 1, lines 163 and 155, tongue 156 of relay 8, companion lower stationary contact (relay 8 being un-energized), line 157, through solenoid 29 of relay 7, to negative terminal. This will produce the first secondary pulse which sets the cam shaft to its position 1 (see legend, FIGURE 8).

With the completion of pulse 1 (receiver off the hook), cams 4 and 5 are activated. The circuitry from the input terminal 41 (to which terminal the calling station connects), to the output terminal 44 (which connects to the line extending to the attended office), remains unchanged from cam position 1 to cam position 10. Therefore the first and succeeding dialing pulses through pulse 10 will be produced over the circuitry as follows: each such pulse acting through the solenoid 140 of relay 34, to produce a secondary pulse by opening and closing the tongue 145 from its companion lower stationary contact. These successive pulses act through the circuitry beginning at the positive input terminal 142, through the tongue 143 of relay 35 to the companion lower stationary contact, line 144 to the tongue 145 of relay 34, lower stationary contact for such tongue (it being now noted that each primary pulse delivered over the solenoid 140 by dialing, acts to raise the tongue 145 of such relay 34), lines 146ᵃ, 147 and 164, to tongue 165 of cam 1 (see cam position 1 of legend, cam now non-activated), lower stationary contact of tongue 165, line 166 to lower stationary contact of cam 1, tongue 162 of cam 1, lines 163, 155, leaf 156 of relay 8, and line 157 to solenoid 29 of relay 7, thus producing an advancing step of the cam shaft 20. Like succeeding dialing pulses up to pulse 10, will produce successive cam shaft advances.

Examination of the legend on FIGURE 8, it is seen that at the next position 11, cam 5 is activated, and cam 6 is dropped, and cams 4 and 7 remain activated.

The activation of cam 5 at cam position 11 serves to deliver to the operator at the attended office, an identification signal, identifying the calling station as a pre-pay station. This operation is produced as follows:

The pre-pay station identity tone is received from the terminal 52 (FIGURE 8), and transmitted over the lines 167, 168, 169 and 173ᵃ to the stationary top contact 170, now engaged by the tongue 171 (cam 5 being activated at position 11); thence by lines 172, 173, 101 and 100, to the terminal 44, and to the telephone line extending to the attended office. Accordingly, the attended office operator is informed that a pre-pay station is calling.

At position 11 cams 4, 5 and 7 being activated, the operator at the attended office may cause return of the coins deposited at the calling station. This operation is as follows:

Upon receipt of a coin return signal from the attended office operator (received over the terminals 43–44 of FIGURE 8), and transmitted to the terminals 45–46 of such FIGURE 8, the response unit 103 of FIGURE 10 (together with the "Guard") responds to deliver a "Return" signal to the terminal 48 of FIGURE 10, which is connected to the corresponding terminal 48 of FIGURE 8; thence over the lines 106 and 107 to the solenoid 108 of the return relay 31; the free end of the solenoid 108 being connected by the line 108 to the contacts 110 of the collect relay 32 (still closed, since the collect relay is not energised), and to the negative terminal. Thus the return relay is activated, delivering negative 120 v. D.C. to both of the lines extending to the pre-pay phone in question, as follows: From the negative 120 v. D.C. terminal 40, over the line 111 to the contact 112 of the collet relay 32 (still closed), over the line 113 to the contacts 114 of the return relay 31 (now closed), over the lines 115 and 116 to the solenoid 117 of relay 36, and over the line 118 to cam 4 (still closed), over lines 120, 121, 122 and 123 to the upper contacts of the pairs 124 and 125 of relay 31 (closed), over the lines 126 and 127 to the terminals 41 and 42 leading between the P.S.U. (FIGURE 8) and the pre-pay phone in question. It is noted that this operation serves to short such two terminals 41 and 42 together, thus shorting the telephone lines to such pre-pay phone. This is proper since no talking is presently occurring. Thus a double conductivity is produced from the P.S.U. to such pre-pay phone, to carry the 120 v. D.C. needed for operation of the coin return unit. The control tone signal for operation of the return unit, continues only as long as the operator at the attended office holds her key, being only for a short interval, producing a pulse. Thereupon the short between the telephone lines leading to the pre-pay phone is removed, permitting free conversation.

During the pulsing operations to cam position 10, cam 6 has been activated, holding its contacts 176 open. However, at cam position 11, cam 6 is released, closing its contacts. Accordingly, at cam position 11 the following circuit is produced: right-hand end of solenoid 140 of relay 34, lines 141, 101, 173, 174 and 175, contacts 176 (closed), lines 177, 161 and 139, to the left-hand end of the solenoid 140; the capacitor 178 (and, if desired, the capacitor 179 in parallel therewith), being included in the above circuitry. Thus a shunt line, including the capacitance, is placed across the solenoid 140 at cam position 11. Relay 33 is slow operating, as legended. One end of the solenoid 180 is connected to the negative terminal 181. The other end of such solenoid connects by the lines 182 and 151 to the tongue 147a of cam 7 (still activated at cam position 11), thence to the companion top contact, line 150, to the top contact of relay 34, to which the tongue is engaged each time such relay is energized. Accordingly, at each pulse-produced operation of such relay 34, a corresponding pulse is delivered through the solenoid 180 of relay 33; but due to the fact that such relay is slow operating such pulses to such relay 33 for cam positions 2 to 10, are not sustained long enough to cause operation of relay 33, which thus remains unactivated during the pulses and cam positions up to 10. However, when the next pulse (for cam position 11) is produced, the activation of solenoid 140 of relay 34 is sustained long enough (due to the shunt capacitance placed across its solenoid), to cause operation of relay 33, reaising its tongues into engagement with their companion stationary contacts.

The line 183 connects the tongue 184 of relay 33, to the line 151 which delivers the starting pulse to the solenoid 180 of relay 33, as already explained. The stationary contact companion to such tongue 184 connects by the line 185 with the tongue 186 of cam 3 (unactivated, up to and at cam position 25), and the stationary contact companion to such tongue 186 connects to the positive input 187. Accordingly, once the relay 33 has been activated, it will be held by the holding circuit thus established, until cam 3 is activated to separate its tongue from its stationary contacts. This operation occurs at cam position 25, presently to be considered.

If a local call is completed there is reversal of polarity on the telephone lines extending from the calling station to the P.S.U. Under this condition the received signals from the calling station, delivered to the P.S.U., will flow in reversed direction through the circuitry of such P.S.U., as follows:

Entering at terminal 44 (FIGURE 8), over lines 100, 101, 141 and 148 (including diode 149), through solenoid 146 of relay 35, over lines 147a and 137, to the lower stationary contact and tongue 135 of relay 32, lines 136 and 188 to the lower stationary contact of the pair 125 of relay 131, tongue of such pair, and lines 189 and 127, to the terminal 41 connecting to the line between the pay station and the P.S.U. During this reversed polarity operation current flow through the solenoid 140 of relay 34 is blocked by the diode 138a in the line 138; thus relay 34 remains idle as long as such reversed polarity continues.

During continuation of the reversed polarity, relay 35 is activated and its tongue 143 is engaged with the companion upper stationary contact. Such tongue receives positive potential from the input 142; therefore such stationary contact also receives positive potential. Such contact connects by the line 190 (including a diode), to the tongue 191 of relay 33. Therefrom the upper stationary contact of such tongue connects by the line 192 with the tongue 193 of cam 2 which is non-activated. The lower stationary contact of such tongue connects by the lines 194, 154 and 155 with the tongue 156 of relay 8, lower contact, and line 157, to the solenoid 29 of relay 7, and to the negative terminal. Thus relay 7 is activated, raising its tongue 195 into engagement with the companion upper stationary contact 196. Such contact 196 connects by the line 197 with the line 155, and the tongue 195 connects to the solenoid 30 of relay 8 by the line 198, the free end of such solenoid being connected to negative. Accordingly, when a current originating at the tongue 191 of relay 33 is sustained, the two relays 7 and 8 will self-pulse, producing pulsed operations to advance the cam shaft step-by-step as long as the supply of potential to the lines 154 and 155 continues.

The foregoing self-pulsing operation remains in force as long as the holding circuit is operative. That circuit includes the tongue 186 of cam 3, which tongue is engaged with its companion stationary contact when such cam 3 is un-activated. Accordingly the holding circuit will be released at cam position 25 (see legend). Thereupon relay 33 will be released (no source of current being connected to its solenoid, then the holding circuit just terminated). Release of relay 33 will discontinue supply of current from the source 142, thus terminating the self-pulsing operation at cam position 25, when such self-pulsing operation depends on continued holding operation for relay 33. Self-pulsing operation may, however, be produced by other circuitry, as will hereinafter appear.

The coin return and coin collect operations are both dependent on activation of cam 4, as evident from description of the coin return structure already detailed, and as will be evident from description of the coin collect operations and structures to be presently detailed. Cam 4 activation is produced from cam position 1 to position 17, and from position 22 to positions 34, 35 and 36. Accordingly, during the first interval (position 1 to position 17), the return operation may be produced by proper tone control signal delivered by the attended office attendant. The call cannot be completed (by raising the receiver from the hook) by the called party, until the ten dialed pulses have been produced (for the case of a call requiring operation by the operator at the attended office).

Study of the circuitry involved in the coin return operation, already described, and in the coin collect operation, presently to be described, shows the above operations to include cam 4 activation; but the activation of other cams during such coin return and collect operations, is not needed for them. Accordingly, the coin return operation may be performed by the attended office operator at any time after completion of the tenth dialed pulse; and that at any time after completion of such tenth dialed pulse the coin collect operation may be produced not later, however, than the completion of the 17th pulsed shaft cam position. It is also evident that the coin collect operation may be produced (requiring activation of cam 4), between cam positions 22 and 28, and between cam positions 34 through 36. Accordingly, after completion of a call by response of the called party, and reversal of polarity, the operator at the attended office has considerable time, during which she may cause emission of the coin collect tone signals, and production of the coin collect operation at the pre-pay station. The circuitry for producing the coin collect operation is as follows:

Upon receipt of a coin collect signal from the attended office operator (received from the terminals 43–44 of FIGURE 8, and transmitted to the terminals 45–46 of such FIGURE 8), the response unit 104 of FIGURE 10 responds (together with the "Guard" unit response), to deliver a collect signal to the terminal 47 of FIGURE 10, which is connected to the correspondingly numbered terminal of FIGURE 8; thence over the line 128 to the solenoid 129 of the collect relay 32, the free end of such solenoid being connected to negative. Thus such collect relay will be activated. This will produce the following operations:

Positive 120 v. D.C. will be delivered from the terminal 39 (FIGURE 8), over the line 130, through the contacts 131 of the collect relay (now activated), to the line 132 which connects with the line 116 leading to the relay 36 and connections therefrom, through the contacts of cam 4 (now activated), and to both of the lines 126 and 127, as follows: From cam 4 contacts 119, over lines 120, 121 and 122 to contacts 133 of relay 32 (now closed), over line 134 to lower contact of leaf 124, relay 31 (now activated), thence to leaf 124, and line 126, to terminal 42; and also from line 122 to upper contact of leaf 135 of relay 32 (now activated), over line 136 to lower contact of leaf 125, to leaf 125, to line 127 leading to terminal 41 of the lines leading to the pre-pay phone. Thus both such lines receive positive 120 v. D.C. for operation of the coin collect element of the pre-pay phone. In this case also, both of the talking lines are shorted together, and both deliver the 120 v. D.C. for operation of the coin collect unit, over a conductance of maximum availability at the time of such operation, and without interference with the talking facilities of the pre-pay phone at a talking interval.

The self-pulsing operation will be continued from cam position 25 to cam position 36 over a circuit not requiring the activation of cam 3 (for maintaining a holding circuit for relay 33), as follows:

Remembering that cam 1 remains un-activated for all cam positions except position 36 (final), and that relays 5 and 4 are non-activated during the cam interval from position 25 to position 36, the following circuitry is available and traced: Positive input from terminal 142, tongue 143 of relay 35 (un-activated), lower stationary contact, line 144, tongue 145 of relay 34 (un-activated), lower stationary contact, lines 146ᵃ, 147, 164, tongue 165 of relay 1 (un-activated), lower stationary contact and line 166, lower stationary contact of tongue 162, through such tongue, lines 163 and 155, tongue 156 of relay 8, lower stationary contact, line 157, and through solenoid 29 of relay 7, to negative. Thence self-pulsing between relays 7 and 8 will continue as long as current is supplied by continued un-activation of cam 1. Such activation occurs at cam position 36, when the operations of the P.S.U. are terminated. Additionally, provision is made for operation of the coin collect unit concurrently with such termination of P.S.U. stepping, as follows:

A line 199 connects from the line 166 which is electrified during the just explained operations (cam 1 being un-activated) to the tongue 200 of cam 3 (activated at position 25, and until position 36), upper stationary contact of cam 3, and line 201 to connection with the right-hand end of solenoid 129, being the collect relay. Accordingly, as long as cam 3 remains activated, which interval will include the talking time of the completed call, the coin collect relay will continue activated, regardless of arrival of any control signal for collect, emitted by the operator at the attended office. Thus there is provided insurance that coin collect will be made, in any case, whether by action of the operator, or automatically, at completion of the cycle of operations of the P.S.U. unit. Such activation of the coin collect relay is produced by current supplied from the input terminal 142 instead of by current supplied by the tone receiver unit shown in FIGURE 10. Activation of relay 36 is co-incident with operation of either the coin return or the coin collect functions, when performed by control signals arriving from the tone receiver unit (FIGURE 10). In either such case, such relay 36 is activated to raise its tongue, producing a circuit as follows:

From the positive input terminal 142, tongue 143 of relay 35, lower stationary contact, line 144, tongue 145 of relay 34, lower stationary contact, and lines 146ᵃ and 202, to button switch 203, normally closed, line 204, tongue 205 of relay 36 (closed whenever either the coin returned or the coin collect tone-controlled operation is functioning), upper contact of such relay, and lines 206 and 207, to alarum 208, to negative. Such alarum is also connected by a line 209 to a top contact 210 of collect relay 32. Accordingly, a normal coin collect operation, produced either automatically by return of the P.S.U. cam shaft to its high position 36, or by normal operation by a control tone received from the attended office, will produce operation of the alarum signal indicating normal operation of the coin collect unit. Failure of the alarum signal to function will indicate a failure of the collect unit functioning. The button switch 203 may be operated by an attendant to terminate the alarum signal functioning.

The alarum signal 208 is located at the P.S.U. If desired a remote alarum signal may be located at another location, for purposes which will be evident. For this purpose I have shown the line 211 extended to the terminal 212 of the P.S.U., the remote signal being connected by line to such terminal. A convenient arrangement, in the case of such remote signal, will be an arrangement wherein the signal is not given during intervals of proper functioning of the equipment, but will be given (as a signal) when improper functioning of the equipment occurs. Such reversal of signal functioning may be readily produced by introduction of a relay into the lines connected to such terminal 212.

The foregoing described operations relate generally, to pre-pay station originated calls to be handled through the operator-attended-office functions. Under such operations the dial of the pre-pay station was first dialed to its "0" or high position, so that the thus dialed operation produced ten pulses to set the cam shaft to its cam position 11. That position caused release of cam 6 back to its un-activated position, shown by the legend (FIGURE 8). At such position the cam contacts 176 closed, with attendant placing of the capacitor shunt across the solenoid 140 of relay 34, and attendant slowing of operation of that relay, producing a time delay sufficient to cause relay 33 to operate, notwithstanding its slow characteristic. To the contrary, dialing to the "0" or high position being avoided when producing a direct call, and under the specification that such direct dialed call entailed use of digits other than the high or "0" dialing position. Under the local dialing operation (without operator control), the dialing pulses will be received from the terminal 41, and delivered over the line 127, contacts 125 of relay 31 (un-activated), line 136, contacts 135 or relay 32 (un-activated), and lines 137, 214, 100 and 215, directly to the terminal 44 (FIGURE 8), and thence to the telephone line leading to the called station, through conventional selectors and other equipment, to complete the connections to such called station.

I claim:

1. A pre-pay telephone system for serving telephone subscribers within a main area which includes an attended office, and for serving a satellite area which includes a pre-pay telephone having coin return and coin collect units; an unattended office serving such satellite area; telephone lines between the pre-pay telephone of the satellite area, and the unattended office; telephone lines between the attended office and the unattended office; means to generate and emit first defined code frequency signals corresponding to coin return unit activations, and to generate and emit second defined code frequency signals corresponding to coin collect unit activations; operator actuated switching means at the attended office; connections between the coin return code frequency emitting means and the coin collect code frequency emitting means, and said operator actuated switching means, constituted to deliver the coin return code frequency signals and the coin collect code frequency signals, to the operator actuated switching means; connections between the operator actuated switching means and the telephone lines which are between the attended office and the unattended office; wherein the operator actuated switching means includes means to deliver either the coin return frequency code signals or the coin collect frequency code signals, selectively, to said telephone lines which are between the attended office and the unattended office; selector means in connection with the unattended office, including means to respond to the code frequency coin return signals, or to the code frequency coin collect signals and deliver either the coin return activating current or the coin collect activating current, selectively, to said telephone lines which are between the unattended office and said pre-pay telephone; and connections between said last named telephone lines and the coin return and the coin collect units of the pre-pay telephone, constituted to deliver either the coin return activating current, to the coin return unit, or to deliver the coin collect activating current, to the coin collect unit.

2. A pre-pay telephone system as defined in claim 1; wherein the code frequency signals comprise sonic frequency signals.

3. A pre-pay telephone system as defined in claim 1; wherein the code frequency signals comprise signals of the frequency of substantially 2200 c.p.s. corresponding to one pre-pay coin unit activation, and of the frequency of substantially 2700 c.p.s. corresponding to the other pre-pay unit activation.

4. A pre-pay telephone system as defined in claim 1; wherein each code frequency signal comprises the combination of two sonic frequencies, one of which comprises a guard frequency; and wherein the non-guard frequencies are different from each other.

5. A pre-pay telephone system as defined in claim 4; wherein the guard frequencies of both combination of two frequencies, are the same.

6. A pre-pay telephone system as defined in claim 4; wherein the means to generate and emit the first defined code frequency signals and the second defined code frequency signals, comprises a three-tone generating section including three tuned frequency delivering units, two of which generate and deliver the first defined code frequency and the second defined code frequency, respectively, and the third of which frequency delivering units generates and delivers the guard frequency; means to mix the guard frequency with each code defined frequency; and means to deliver each mixture of a code defined frequency with the guard frequency, to the operator actuated switching means which is in the attended office.

7. A pre-pay telephone system as defined in claim 6; wherein the means to generate the code frequency signals includes duplicate three tone generating unit sections, and duplicate means to mix each code defined frequency with the guard frequency, and mixture delivering means for each mixture of the guard frequency with a code defined frequency; together with a fail-safe section including means constituted to compare the potential strength of the delivered code frequency mixture of a selected one of the sections, with a comparison potential strength; code and guard frequency mixture delivery terminals; two position switching means intermediate between the mixture delivering means of the two sections, and said mixture delivering terminals, biased for connection of the code frequency signals from said selected one of the three-tone generating sections, to such code and guard frequency mixture delivering terminals together with connections between the fail-safe section and the two position switching means, constituted to cause said switching means to discontinue connection of said selected one of the three-tone generating sections, with the code and guard mixture frequency delivering terminals, and to produce connection of the non-selected one of the sections, to such code and guards frequency mixture delivering terminals, when the differential between the potential strengths of the code frequency mixture of such selected section, and said comparison potential, is less than a pre-determined value.

8. A pre-pay telephone system as defined in claim 1; wherein the coin return and coin collect units include D.C. operated coin return elements, wherein the D.C. operations of such elements are responsive to D.C. potentials of opposite polarities, and wherein the coin return activating currents and the coin collect activating currents which are delivered by the response means which is in connection with the unattended office, are of opposite polarities.

9. A pre-pay telephone system as defined in claim 1; wherein the telephone lines which are between the unattended office and the pre-pay telephone, include a metallic line extending substantially between such unattended office and such pre-pay telephone.

10. A pre-pay telephone system as defined in claim 9; wherein said telephone lines which are between the unattended office and the pre-pay telephone, comprise full metallic circuitry; and wherein the means which is responsive to the code frequency return signals, or to the code frequency coin collect signals, and the means which delivers the coin return activating current or the coin collect activating current, to the telephone lines which are between the unattended office and the pre-pay telephone, delivers such activating current to both of the telephone lines which are between the unattended office and the pre-pay telephone.

11. In a pre-pay telephone system wherein there is provided a pre-pay telephone having a coin return activating unit responsive to current of one specification, and also having a coin collect activating unit responsive to current of a different specification, which system includes an attended office and an unattended office; telephone lines extending between the attended office and the unattended office, and telephone lines extending between the unattended office and the pre-pay telephone; means to generate a code frequency signal of one frequency corresponding to a coin return operation, means to generate a code frequency signal of another frequency corresponding to a coin collect operation; operator controlled means at the attended office including means to select and connect to the telephone lines which are between the attended office and the unattended office, such operator selected code frequency signal which corresponds to a selected coin unit operation of the pre-pay telephone; means at the unattended office to receive such selected code frequency signal and to translate such signal and deliver a current of the specification which activates the selected coin unit operation; together with means at the unattended office to deliver to the telephone lines which extend between the unattended office and th pre-pay telephone, the current of such specification.

12. A pre-pay telephone system as defined in claim 11; wherein the currents of said specifications are D.C.

13. A pre-pay telephone system as defined in claim 12; wherein the D.C. of one specification is a positive current, and the D.C. of the other specification, is a negative current.

14. A pre-pay telephone system as defined in claim 11; wherein the means at the unattended office which delivers to the telephone lines which extend between the unattended office and the pre-pay telephone, the current of such specification, comprises means to deliver such current of such specification to both of the telephone lines extending between the unattended office and the pre-pay telephone.

15. A pre-pay telephone system as defined in claim 11; wherein the unattended office includes a step-by-step switching unit including means to advance groups of contacts step-by-step through cycles of steps from a starting position to a terminal position; and wherein the pre-pay telephone includes pulse producing means and means to produce sets of pulses of selected digital values to a high value pulse set; wherein the step-by-step switching unit and the telephone lines which extend between the pre-pay telephone and the unattended office, include means to deliver the pulses of the high value pulse set to said step-by-step switching unit with advance of said switching unit to a pulse advanced position corresponding to the number of pulses of such high value pulse set; and wherein the means at the unattended office which delivers current of the specification which activates the selected coin unit operation of the pre-pay telephone, comprises circuitry including switching contacts constituted to cause delivery of such current of such specification, to the coin operation producing means of the pre-pay telephone, when the step-by-step switching unit produces a series of steps corresponding to the high value pulse set of the pulse producing means of such pre-pay telephone.

16. A pre-pay telephone system as defined in claim 15; together with connections between the telephone lines which extend between the pre-pay telephone and the unattended office, and the telephone lines which extend between the unattended office and the attended office, constituted to deliver pulses produced by the pulse producing means of the pre-pay telephone, to the attended office.

17. A pre-pay telephone system as defined in claim 15; wherein the step-by-step switching unit and the unattended office, include contacts and circuitry non-activated by the coin collect code frequency from the attended office, constituted to deliver current of the specification which activates the coin collect unit of the pre-pay telephone, when the step-by-step switching unit is at a stepped position higher than the stepped position which corresponds to the high pulse value of the pulse producing means of the pre-pay telephone.

References Cited

UNITED STATES PATENTS

| 2,897,272 | 7/1959 | Gatzert et al. | 179—6.3 |
| 3,306,983 | 2/1967 | Goodwin et al. | 179—26 |
| 3,341,662 | 9/1967 | Cerny et al. | 179—6.3 |

FOREIGN PATENTS

| 916,690 | 1/1963 | Great Britain. |

KATHLEEN H. CLAFFY, Primary Examiner

J. S. BLACK, Assistant Examiner